(12) United States Patent
Crisfield et al.

(10) Patent No.: US 6,308,580 B1
(45) Date of Patent: Oct. 30, 2001

(54) CORIOLIS FLOWMETER HAVING A REDUCED FLAG DIMENSION

(75) Inventors: Matthew T. Crisfield, Boulder; Steven James Johnston, Westminster; John Richard McCarthy, Boulder, all of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/272,150

(22) Filed: Mar. 19, 1999

(51) Int. Cl.⁷ ....................................................... G01F 1/84
(52) U.S. Cl. ....................................................... 73/861.355
(58) Field of Search ........................ 73/861.355, 861.356, 73/861.357

(56) References Cited

U.S. PATENT DOCUMENTS

| 4,781,069 | 11/1988 | Mitzner . |
| 4,852,410 | * 8/1989 | Corwon et al. ................. 73/861.355 |
| 4,895,031 | * 1/1990 | Cage ................................ 73/861.355 |
| 5,370,002 | 12/1994 | Normen et al. . |

FOREIGN PATENT DOCUMENTS

| 0 246 510 A1 | 11/1987 | (EP) . |
| 0 816 807 A2 | 1/1998 | (EP) . |

* cited by examiner

Primary Examiner—Harshad Patel
(74) Attorney, Agent, or Firm—Chrisman Bynum & Johnson, P.C.

(57) ABSTRACT

A Coriolis flowmeter sensor having a reduced flag dimension. In order to have a reduced flag dimension, the entire length of the flow tubes must vibrate to make the flowmeter sensor more sensitive to Coriolis effects. When the entire length of the flow tubes vibrate, a first set of brace bars connected to the flow tube separates the frequencies of vibration in the flow tubes. A second set of brace bars connected to the flow tubes enhances the zero stability of the flowmeter.

15 Claims, 3 Drawing Sheets

CORIOLIS FLOWMETER HAVING A REDUCED FLAG DIMENSION

FIELD OF THE INVENTION

This invention relates to Coriolis flowmeters. More particularly, this invention relates to reducing a flag dimension of a Coriolis flowmeter by vibrating the entire length of the flow tubes. Still more particularly, this invention relates to the use of two sets of brace bars where a first pair of brace bars adequately separates the frequencies of vibration and a second set of brace bars enhances zero stability in the system.

PROBLEM

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and Pat. No. Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending torsional, or coupled type. Each flow tube is driven to oscillate at resonance in one of these natural modes. The natural vibration modes of the vibrating, material filled system are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a force to the flow tube in order to cause the flow tube to oscillate in a desired mode of vibration. Typically, the desired mode of vibration is a first out of phase bending mode. When no material is flowing through the flowmeter, all points along a flow tube oscillate with an identical phase. As the material begins to flow, Coriolis accelerations cause each point along the flow tube to have a different phase with respect to other points along the flow tube. The phase on the inlet side of the flow tube lags the driver, while the phase on the outlet side leads the driver. Sensors are placed on the flow tube to produce sinusoidal signals representative of the motion of the flow tube. The phase difference between the two sensor signals is proportional to the mass flow rate of the material flowing through the flow tube or flow tubes. Electronic components connected to the sensor then use the phase difference and frequencies of the signals to a determine mass flow rate and other properties of the material.

An advantage that Coriolis flowmeters have over other mass flow measurement devices is that flowmeters typically have less than 0.1% error in the calculated mass flow rates of a material. Other conventional types of mass flow measurement devices such as orifice, turbine, and vortex flowmeters, typically have 0.5% or greater errors in flow rate measurements. Although Coriolis mass flowmeters have greater accuracy than the other types of mass flow rate devices, the Coriolis flowmeters are also more expensive to produce. Users of flowmeters often choose the less expensive types of flowmeters preferring to save cost over accuracy. Therefore, makers of Coriolis flowmeters desire a Coriolis flowmeter that is less expensive to manufacture and determines mass flow rate with an accuracy that is within 0.5% of the actual mass flow rate in order to produce a product that is competitive with other mass flow rate measurement devices.

One reason that Coriolis meters are more expensive than other devices is the need for components that reduce the number of unwanted vibrations applied to the flow tubes. One such component is a manifold which affixes the flow tubes to a pipeline. In a dual tube Coriolis flowmeter, the manifold also splits the flow of material received from a pipeline into two separate flows and directs the flows into separate flow tubes. In order to reduce the vibrations caused by outside sources, such as a pump, that are connected to the pipeline, a manifold must have a stiffness that is sufficient enough to absorb the vibrations. Most conventional manifolds are made of cast metal in order to have a sufficient mass. Furthermore, there is a spacer between the manifolds that maintains the spacing between inlet and outlet manifolds. This spacer is also made out of a metal or other stiff material in order prevent outside forces from vibrating the flow tubes. The large amount of metal used to create these castings increases the cost of the flowmeter. However, the elimination of unwanted vibrations greatly increases the accuracy of the flowmeters.

A second problem for those skilled in the Coriolis flowmeter art is that flowmeters may have a flag dimension that is too big to be used in certain applications. For purposes of this discussion, flag dimension is the length that a flow tube loop extends outward from a pipeline. There are environments where space is constrained or is at a premium. A flowmeter having a typical flag dimension will not fit in these confined areas. There is a need for a Coriolis flowmeter that has a reduced flag dimension that can be inserted into a pipeline in a confined area or where space is at a premium and still provides readings that are within the 0.5% of the actual flow rate of a material.

SOLUTION

The above and other problems are solved and an advance in the art is made by the provision of a Coriolis flowmeter having a reduced flag dimension in the present invention. The Coriolis flowmeter of the present invention does not have a conventional manifold and spacer. Therefore, the cost to produce the flowmeter of the present invention is reduced. The Coriolis flowmeter of the present invention also has a reduced flag dimension which allows the Coriolis flow meter of the present invention to be used in areas where space is at a premium and it would be impossible to use a conventional Coriolis flowmeter having a conventional flag dimension.

In order to eliminate a conventional manifold and to reduce the flag dimension of a Coriolis flowmeter, the entire length of each flow tube must vibrate to increase the sensitivity of the flowmeter. Therefore, the flowmeter must be designed in the following manner. The flowmeter has a pair of flow tubes that aligned parallel to one another.

Each flow tube is a continuous length of flow tube divided in several segments. At an inlet end and an outlet end of each flow tube, the flow tubes have in-line segments which have a longitudinal axis that is oriented in a first plane that contains the connected pipeline. A first end of the in-line segments connects the flow tubes to inlet and outlet manifolds. Bending segments in each flow tube extend outward from a second end of the in-line segments of the flow tube. Each bending segment is a curved section of tube that changes orientation of the longitudinal axis of the flow tube from the first plane to a direction that is substantially perpendicular to the first plane containing the pipeline.

A u-shaped segment extends between the two bending segments of each flow tube. The u-shaped segment has a first section that extends outward from a first bending segment with a longitudinal axis oriented in a direction that is substantially perpendicular to the first plane containing pipeline. A second, curved section of the u-shaped segment bends the flow tube to connect the first section and a third section of the u-shaped segment. A third section of the u-shaped segment has a longitudinal axis that is substantially perpendicular to the first plane and connects the curved section of the u-shaped segment to a second bending segment to complete the flow tube. In a preferred embodiment, the first section and third section of the u-shaped segment extend outward from the bending segments with a longitudinal axis that is substantially three degrees from being perpendicular with the first plane which allows the flowmeter to be self-draining when the pipeline and first plane are oriented substantially perpendicular to the ground.

Since the entire length of each flow tube must vibrate in order to reduce the flag dimension of the flowmeter, a first set and a second set of brace bars are needed to reduce extraneous vibrations to allow the oscillations of the flow tube to be measured with enough accuracy that the flow rate calculated from the measured phase is within 0.5% of the correct value. The first set of brace bars orders the vibrations to better separate modes of vibration in flow tubes. The second set of brace enhance the zero stability of the flow tubes to make the measurements more accurate.

To separate vibrations modes in the flow tube while the flow tube is being oscillated, the first set of brace bars are affixed to both flow tubes at a point in each bending section of the flow tubes where the longitudinal axis of the flow tubes is oriented in a direction substantially forty-five degrees with respect to the first plane. Brace bars are a metal component that are affixed to each of the flow tubes at substantially the same location along the flow tubes.

A second set of brace bars is affixed to the flow tubes at a point along the bending segments of the flow tubes that is between the first set of brace bars and the in-line segments of the flow tubes. The second set of brace bars enhance zero stability for the flow tubes. Zero stability is the amount of flow that is indicated when there is no flow through the tubes. Ideally, there is zero flow indicated when there is no flow. In a preferred exemplary embodiment, the second set of brace bars are affixed to the bending segments of the flow tubes at a point where the longitudinal axis is oriented in a direction that is at least seven and a half degrees and no more than twenty-two and a half degrees with respect to the first plane.

A first manifold is connected to an inlet end of the flow tubes. The first manifold is configured to be connected to a pipeline and receive a flow of material from the pipeline. The flow is then divided into two separate flows which are each directed into one of the flow tubes. The flows then flow through each tube and are received by a second manifold. The second manifold joins the two separate flows into an outlet flow and directs the outlet flow back into the pipeline.

A spacer may also be affixed to the first and second manifolds. The spacer encloses the in-line and bending segments of the flow tube and has an opening through which the u-shaped segments of the flow tubes protrude. A housing enclosing the u-shaped segment of the flow tube may then be affixed to the spacer.

DESCRIPTION OF THE DRAWINGS

The above and other features can be understood from detailed description below and the following drawings.

DETAILED DESCRIPTION

Figure 1:
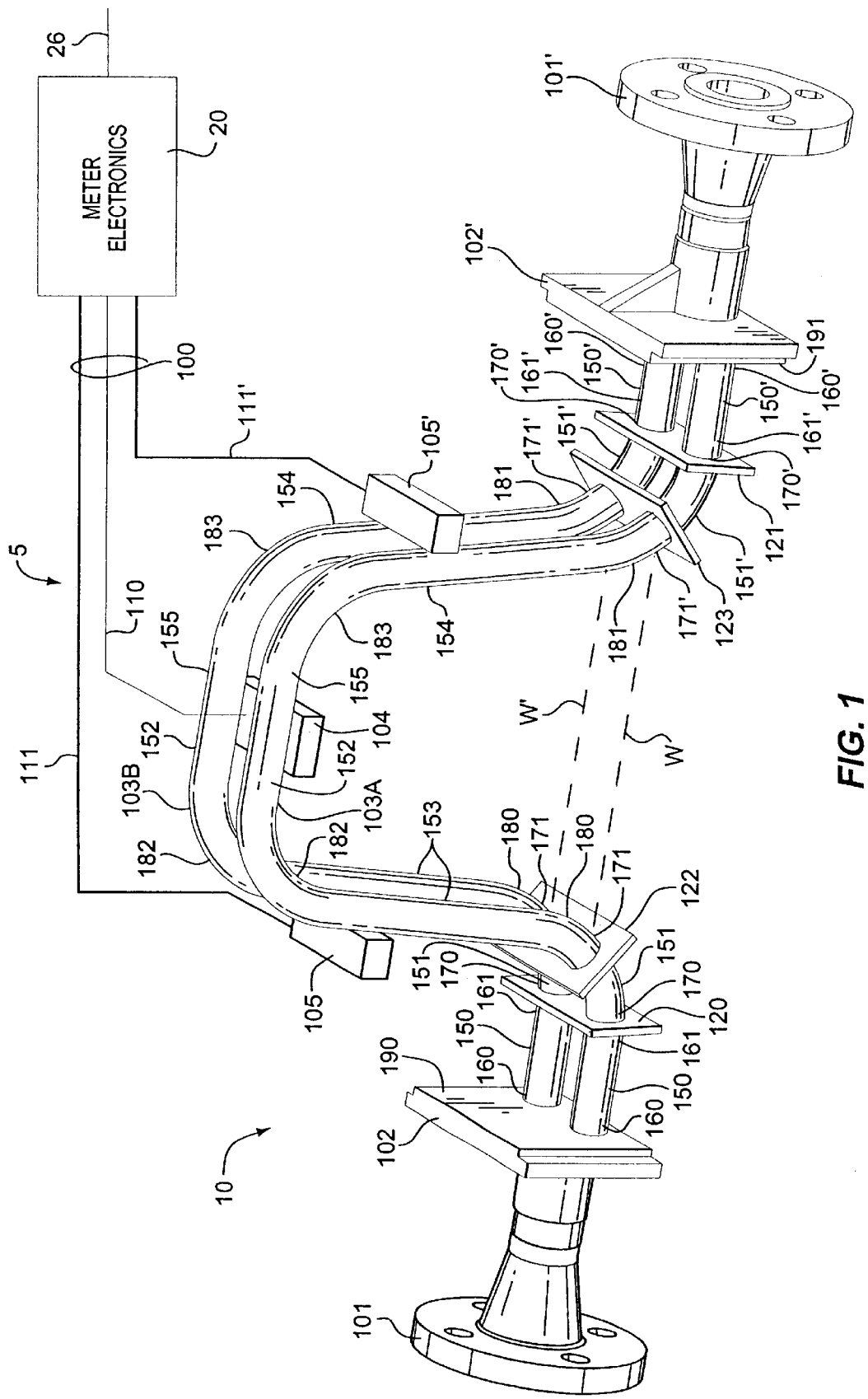
FIG. 1 illustrating a Coriolis flowmeter having a reduced flag dimension.

Coriolis Flowmeter in General—FIG. 1

FIG. 1 illustrates a Coriolis flowmeter 5 comprising a flowmeter sensor 10 and meter electronics 20. Meter electronics 20 is connected to meter sensor 10 via leads 100 to provide density, mass flow rate, volume flow rate, totalized mass flow, temperature, and other information over path 26. It should be apparent to those skilled in the art that the present invention can be used by any type of Coriolis flowmeter 5 regardless of the number of drivers, the number of pick-off sensors, the operating mode of vibration. Furthermore, the present invention may be used in any system that vibrates the two flow tubes 103A–103B in order measure Coriolis effects as a material flows through the flow tube and then uses the Coriolis effect to measure a property of the material.

Flowmeter sensor 10 includes a pair of flanges 101 and 101'; manifolds 102–102'; flow tubes 103A and 103B; brace bars 120–123; driver 104; and pick-offs, 105 and 105'. Flanges 101–101' are affixed to manifolds 102–102'. Manifolds 102–102' are affixed to opposing ends of flow tubes 103A–103B. Brace bars 120–124 are affixed to the flow tubes 103A–103B as described below. Driver 104 is affixed to flow tubes 103A–103B in position where the driver can vibrate flow tubes 103A–103B in opposition to one another. Pick-offs 105–105' are affixed to flow tubes 103A–103B at opposing ends to detect the phase difference in the vibrations at opposing ends of flow tubes 103A–103B.

Flanges 101 and 101' are affixed to manifolds 102–102' and connect flow tubes 103A and 103B to a pipeline (not shown). When flowmeter sensor 10 is inserted into a pipeline system (not shown) which carries the material being measured, material enters flowmeter sensor 10 through inlet flange 101 and the total amount of material is divided into two flows by inlet manifold 102 and is directed equally to enter flow tubes 103A and 103B. The material then flows through flow tubes 103A and 103B back into outlet manifold 102' which joins the separate flows. The material then flows through outlet flange 101' where it exits meter sensor 10. Manifolds 102 and 102' are made of a minimal amount of material.

Flow tubes 103A and 103B are selected and appropriately mounted to inlet manifold 102 and outlet manifold 102' so as to have substantially the same mass distribution, moments of inertia, and elastic modules about bending axes W and W' respectively. The flow tubes 103A–103B extend outwardly from the manifolds 102–102' in an essentially parallel fashion.

Flow tubes 103A–B are driven by driver 104 in phase opposition about their respective bending axes W and W' and at what is termed tho first out of phase bending mode of the flowmeter. Driver 104 may comprise one of many well known arrangements, such as a magnet mounted to flow tube 103A and an opposing coil mounted to flow tube 103B. An alternating current is passed through the opposing coil to cause both flow tubes 103A–B to oscillate. A suitable drive signal is applied by meter electronics 20, via lead 110 to driver 104. The description of FIG. 1 is provided merely as an example of the operation of a Coriolis flowmeter and is not intended to limit the teaching of the present invention.

Meter electronics 20 receives the right and left velocity signals appearing on leads 111 and 111', respectively. Meter electronics 20 also produces the drive signal on lead 110 which causes driver 104 to oscillate flow tubes 103A and 103B. The present invention as described herein, can produce multiple drive signals for multiple drivers. Meter electronics 20 process left and right velocity signals to compute mass flow rate. Path 26 provides an input and an output means that allows meter electronics 20 to interface with an operator. The operation of meter electronics 20 is conventional. Therefore, a complete description of meter electronics 20 is omitted for brevity.

The configuration of Coriolis flowmeter sensor 10 allows flow tubes 103A–103B to have a smaller flag dimension while maintaining the accuracy of the readings within 0.5% of the actual mass flow rate. Flag dimension is the length that a loop in a flow tube protrudes outward from a plane that is perpendicular to the loop and that contains the connected pipeline. A second advantage of the configuration of Coriolis flowmeter sensor 10 is that a less expensive manifold and spacer may be used. A third advantage is that by angling the legs of the u-shape segment of the flow tube, the flow tubes are self draining when oriented properly.

In order to have reduced flag dimension, the entire length of flow tubes 103A–103B must be made to vibrate. Therefore, flow tubes 103A–103B are configured in the following manner. Flow tubes 103A–103B are aligned substantially parallel to one another. Each flow tube 103A–103B has the following identical segments: two in-line segments 150–150' at the inlets and outlets of the flow tubes 103A–103B, two bending segments 151–151' extending from in-line segments 150–150', and a u-shaped segment 152 that connects bending segments 151–151'.

In-line segments 150–150' have first ends 160 and 160' connected to manifolds 102–102'. Each in-line segment 150–150' is a portion of flow tube 103A–103B that has a longitudinal axis that is aligned substantially parallel to the pipeline in a first plane that contains the pipeline and in-line segments 150–150' of each flow tube 103A–103B. In-line segments 150 receive material from inlet manifold 102 and in-line segments 150' return material to outlet manifold 102'.

A first end 170–170' of bending segments 151–151' extends outward from second end 161–161' of in-line segments 150–150'. First ends 170–170' of bending segments 151–151' ate in the first plane. Bending segments 151–151' of flow tubes 103A–103B have a second end 171–171' that has a longitudinal axis that is substantially perpendicular to the first plane. Bending segments 151–151' curves between first end 170–170' and second end 171–171'.

U-shaped segments 152 are curved segments of flow tubes 103A–103B that connect the second ends 171–171' of bending segments 151–151'. First end 180 of first leg section 153 of each u-shaped segment 152 extends from second end 171 of each bending segment 151. First leg section 153 extends outward from bending segment 151 and has a longitudinal axis that is substantially perpendicular to the first plane containing the pipeline and in-line segments 150–150'. In an exemplary embodiment, first leg section 153 extends outward from bending segment 151 with a longitudinal axis that is 3 degrees past being perpendicular to the first plane to make flow tubes 103A and 103B self draining when flow tubes 103A and 103B are oriented perpendicular to the ground. A first end 181 of second leg section 154 of u-shaped segment 152 extends outward from a second end 171' of each bending segment 151' with a longitudinal axis that is substantially perpendicular to the first plane. In a preferred exemplary embodiment, second leg section 154 extends outward in a direction that is 3 degrees past being perpendicular with the first plane toward bending segment 151' in order to make flow tubes 103A and 103B self-draining when flow tubes 103A and 103B are oriented in a direction that is substantially perpendicular to the ground.

Curved section 155 connects second end 182 of first leg 153 and second end 183 of second leg 154 in flow tubes 103A and 103B. Curved section 155 extends; outward from second end 182 of first leg 153 with a, longitudinal axis that is substantially parallel to the first plane containing the pipeline and is substantially perpendicular to the longitudinal axises of first and second legs 153 and 154 to connect to second end 183 of second leg 154.

In order to have a reduced flag dimension, the entire length of flow tubes 103A and 103B must vibrate in response to a force applied by driver 104. In order to increase the accuracy of measurements of the Coriolis effects caused by the oscillation and a flow of material, two sets of brace bars must be affixed to flow tubes 103A and 103B. A first set of brace bars 122–123 orders the vibrations in flow tubes 103A and 103B to separate the modes of vibration. A second set of brace bars 120–121 is needed to enhance the zero stability of flowmeter sensor 10. This makes the measurement of the phase difference cause by Coriolis effects easier to measure for meter electronics 20.

The first set of brace bars 122 and 123 are affixed to flow tubes 103A and 103B in bending segments 151–151' at a point where the angle of the flow tubes 103A–103B is substantially forty-five degrees with respect to the first plane containing the pipeline. This first set of brace bars 122 and 123 separate the frequencies of the various modes of vibration.

In order to reduce zero stability problems, second set of brace bars 120 and 121 connect flow tubes 103A–103B. The second set of brace bars 120 and 121 affix to flow tubes 103A and 103B at a point in bending segments 151–151' between the first set of brace bars 122–123 and in-line segments 150–150'. In a preferred exemplary embodiment, the second set of brace bars are affixed to flow tubes 103A–103B at a position in the bending segments 151–151' where the longitudinal axis is oriented at angle within a range between seven and a half degrees and twenty-two and half degrees with respect to the first plane.

Figure 2:
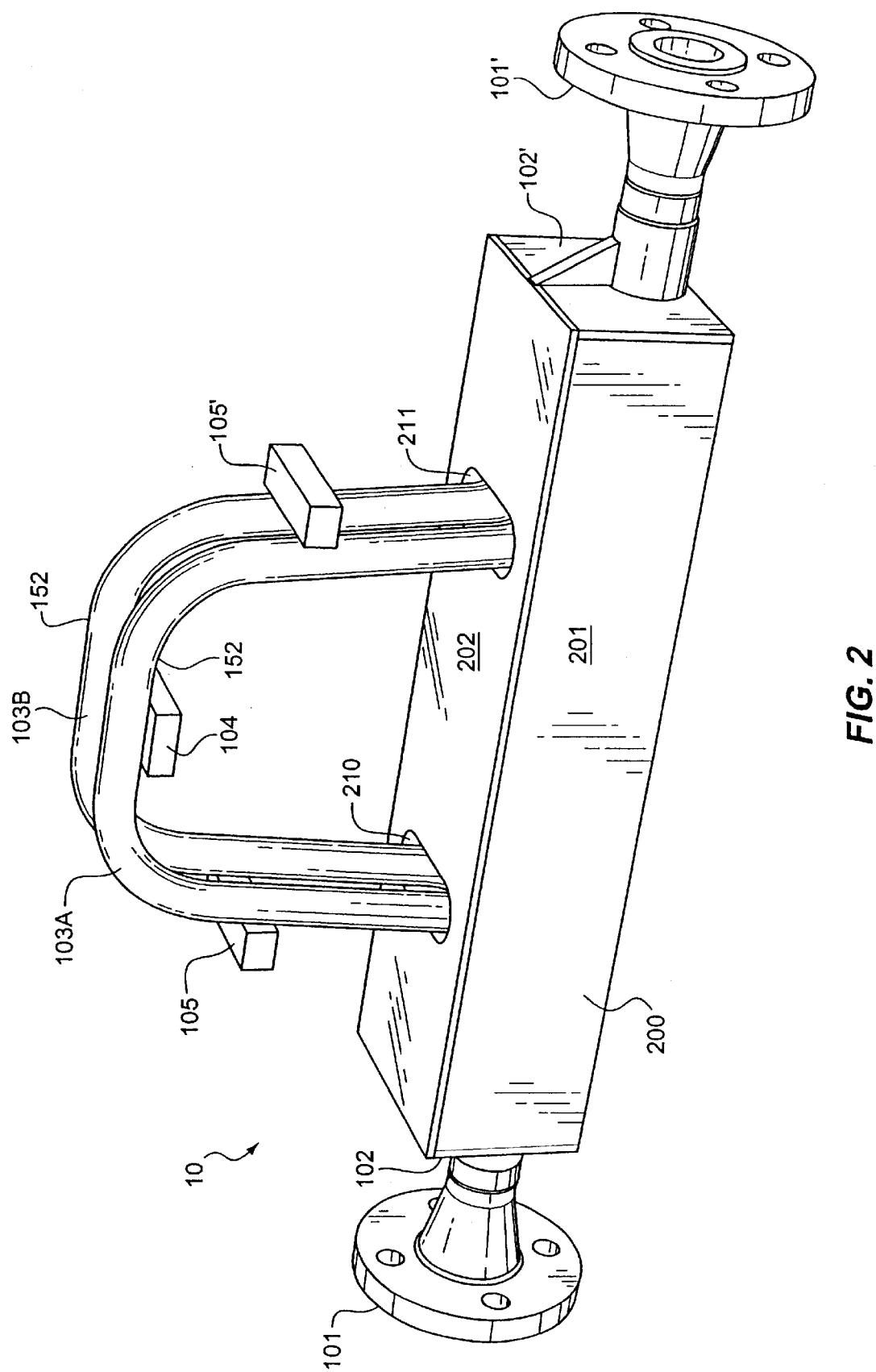
FIG. 2 illustrating a Coriolis flowmeter of this invention affixed to a spacer.

A Spacer Affixed to Manifold 102 and 102'—FIG. 2

FIG. 2 illustrates a spacer 200 affixed to flowmeter sensor 10. Spacer 200 has square ends 190–191 (See, FIG. 1) on opposing sides. In a preferred exemplary embodiment, the square ends 190–191 (See, FIG. 1) are cast as square plates in manifolds 102–102'. Four walls represented by walls 201–202 connect to each edge of square ends 190–191 to form an enclosure. In-line segments 150–150' (SEE FIG. 1) and bending segments 151–151' (SEE FIG. 1) are enclosed by housing 200. U-shaped segment 152 protrudes from openings 210 and 211 in a top side of housing 200. Openings 210 and 211 are of a sufficient size to allow both flow tube 103A–B to fit through the opening. Since both flow tubes 103A–103B fit protrude through openings 210–211, the flow tubes 103A–103B are in no way affixed to housing 200 and the entire length of the flow tubes may vibrate in response to forces applied by driver 104 (see, FIG. 1).

Figure 3:
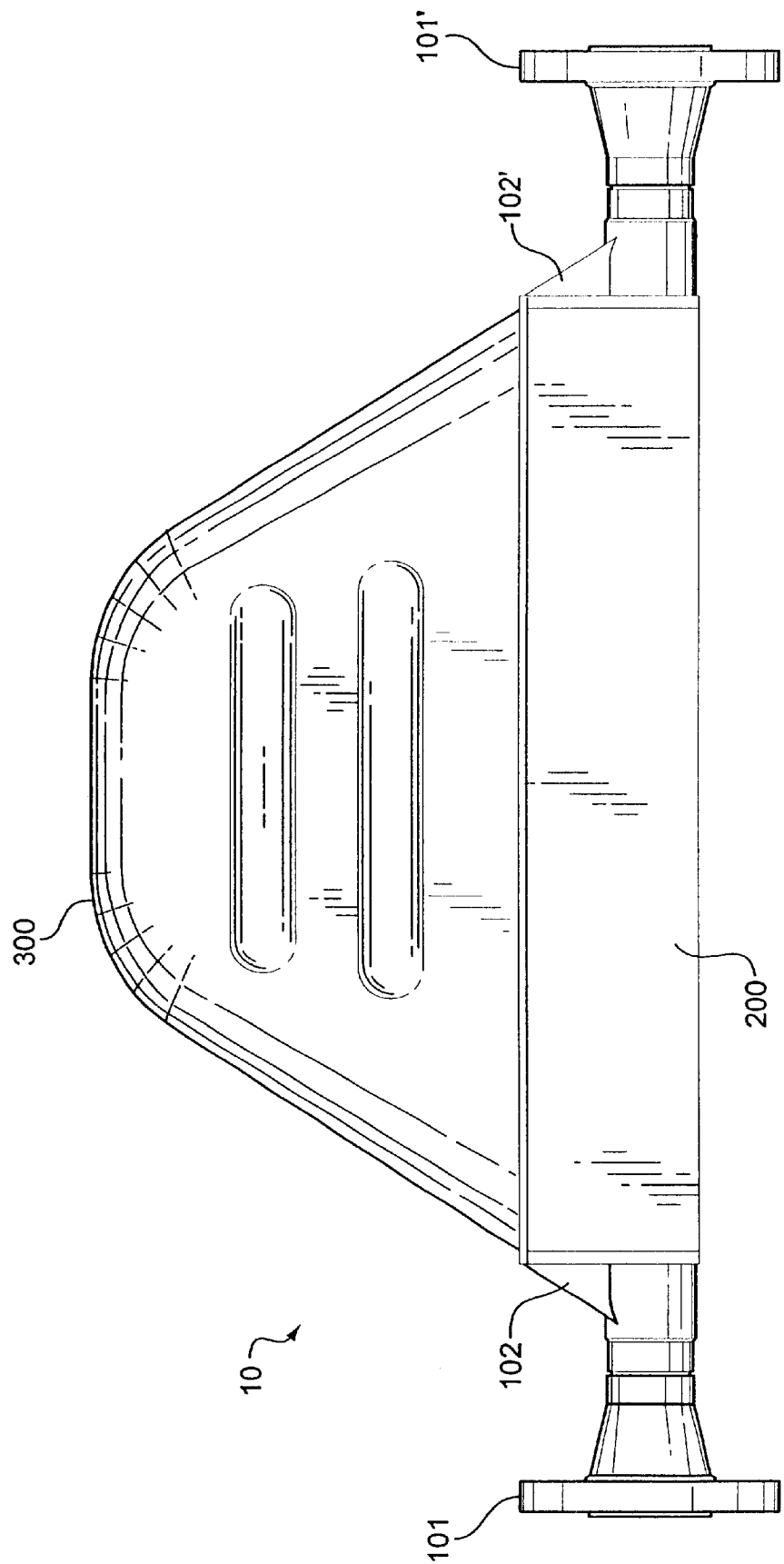
FIG. 3 illustrating a Coriolis flowmeter affixed to a spacer and enclosed in a housing.

A Housing for Flow Tubes 103A–103B—FIG. 3

FIG. 3 illustrates a housing 300 for enclosing flow tubes 103A–103B (Shown In FIG. 1). Housing 300 is a structure having a hollow inside that fits over flow tubes 103A–103B and is affixed to housing 200 in some manner such as a weld, or nuts and bolts. Housing 300 prevents material from escaping in the event that one or both of flow tube 103A–103B rupture.

The above is a description of a Coriolis flowmeter having a minimal flag dimension. It is expected that those skilled in the art can and will design other Coriolis flow meters that infringe on this invention as set forth in the claims below either literally or through the Doctrine of Equivalents.

What is claimed is:

1. A Coriolis flowmeter comprising:
   a pair of parallel oriented flow tubes wherein each of said flow tubes is divided into a plurality of segments including:
   in-line segments defining opposing end portions of each of said flow tubes wherein said in-line segments have a longitudinal axis that is substantially parallel with a longitudinal axis of a pipeline and is contained in a first plane containing said pipeline,
   bending segments in each of said flow tubes that extend from an end of said in-line segments and define a bend that changes said longitudinal axis of each of said flow tubes from being oriented in said first plane to being oriented substantially perpendicular to said first plane, and
   a substantially u-shaped segment that extends between said bending segments on opposing end portions of said flow tubes, wherein said substantially u-shaped segment in each of said flow tubes defines a curve in each of said flow tubes that changes said longitudinal axis of said flow tube to be oriented in a direction that is substantially parallel to said first plane to traverse between said bending segments;
   a first set brace bars affixed to each of said flow tubes at points in said bending segments where said longitudinal axis of said flow tubes is substantially forty-five degrees from being parallel with said first plane;
   said first set of brace bars providing frequency separation between modes of vibration in said flow tubes; and
   a second set of brace bars affixed to said flow tubes at points in said bending segments on said opposing ends of said flow tubes between said in-line segments and said first set of brace bars wherein said second set of brace bars enhance zero stability for each of said flow tubes.

2. The Coriolis flowmeter of claim 1 further comprising:
   a inlet manifold that is connected to a first one of said in-line segments of each of said flow tubes and that receives flow from said pipeline, divides the flow into two flows and directs each of said two flows into a different one of said flow tubes.

3. The Coriolis flowmeter of claim 2 further comprising:
   an inlet flange affixed to said inlet manifold for connecting said inlet manifold to said pipeline.

4. The Coriolis flowmeter of claim 1 further comprising:
   an outlet manifold that is connected to a second one of said in-line segments of each of said flow tubes and that receives said flows from said flow tubes, combines said flows into an outlet flow, and directs said outlet flow into said pipeline.

5. The Coriolis flowmeter of claim 4 further comprising:
   an outlet flange affixed to said outlet manifold for connecting said outlet manifold to said pipeline.

6. The Coriolis flowmeter of claim 1 further comprising:
   manifolds affixed to opposing ends of said flow tubes;
   a spacer affixed to said manifolds with said spacer enclosing said in-line segments and said bending segments of each of said flow tubes; and
   an opening in said spacer through which said u-shaped segments of each of said flow tubes protrude through said spacer.

7. The Coriolis flowmeter of claim 1 wherein said u-shaped segments have a reduced flag dimension.

8. The Coriolis flowmeter of claim 1 further comprising:
   a first leg and a second leg of said u-shaped segment that extend outward from said bending segments with a longitudinal axis that is oriented substantially three degrees from being perpendicular to said first plane.

9. The Coriolis flowmeter of claim 8 wherein said first plane is perpendicular to the ground and said flowmeter is self-draining.

10. The Coriolis flowmeter of claim 1 further comprises:
    a housing enclosing said flow tubes.

11. The Coriolis flowmeter of claim 1 wherein an entire length of each of said flow tubes vibrates.

12. The Coriolis flowmeter of claim 1 wherein said point where said second set of brace bars to said flow tubes is a point where said longitudinal axis of said flow tubes is oriented at an angle in a range between seven and half degrees and twenty-two and half degrees with respect to said first plane.

13. The Coriolis flowmeter of claim 1 further comprising:
    a drive system that oscillates said pair of flowtubes.

14. The Coriolis flowmeter of claim 1 further comprising:
    a first pick-off affixed to said pair of flow tubes on an inlet said of said drive system; and
    a second pick-off affixed to said pair of flow tubes on an outlet side of said drive system.

15. The Coriolis flow meter of claim 1 further comprising:
    meter electronics which receives signal indicating said oscillation of said flow tubes from said pick-offs and determines a mass flow rate of material flowing through said flowmeter.

* * * * *

UNITED STATES PATENT AND TRADEMARK OFFICE
CERTIFICATE OF CORRECTION

PATENT NO.     : 6,308,580 B1
DATED          : October 30, 2001
INVENTOR(S)    : Matthew T. Crisfield, Steven James Johnston and John Richard McCarthy It is certified that error appears in the above-identified patent and that said Letters Patent is hereby corrected as shown below:

Column 4,
Line 56, replace "and at what is termed tho first out of phase bending mode of" with
-- and at what is termed the first out of phase bending mode of --

Column 5,
Line 43, replace "151-151' ate in the first plane. Bending segments 151-151'" with
-- 151-151' are in the first plane. Bending segments 151-151' --

Column 7,
Line 28, replace "a first set brace bars affixed to each of said flow tubes at" with
-- a first set of brace bars affixed to each of said flow tubes at --
Line 42, replace "a inlet manifold that is connected to a first one of said" with
-- an inlet manifold that is connected to a first one of said --

Column 8,
Line 8, replace "manifolds affixed to opposing ends of said flow tubes" with
-- manifolds affixed to said opposing ends of said flow tubes --
Line 13, replace "an opening in said spacer through which said u-shaped" with
-- at least one opening in said spacer through which said u-shaped --
Line 19, replace "10. The Coriolis flowmeter of claim 1 further comprises:" with
-- 10. The Coriolis flowmeter of claim 1 further comprising: --
Line 32, replace "12. The Coriolis flowmeter of claim 1 wherein said point" with
-- 12. The Coriolis flowmeter of claim 1 wherein said points --
Line 33, replace "where said second set of brace bars to said flow tubes is a" with
-- where said second set of brace bars are affixed to said flow tubes are --
Line 34, replace "point where said longitudinal axis is said flow tubes is" with
-- points where said longitudinal axis of said flow tubes is --
Line 40, replace "14. The Coriolis flowmeter of claim 1 further comprising:" with
-- 14. The Coriolis flowmeter of claim 13 further comprising: --
Line 42, replace "said of said drive system; and" with -- side of said drive system; and --
Line 47, "meter electronics which receives signal indicating said" with
-- meter electronics which receives signals indicating said --

UNITED STATES PATENT AND TRADEMARK OFFICE
CERTIFICATE OF CORRECTION

PATENT NO.    : 6,308,580 B1
DATED         : October 30, 2001
INVENTOR(S)   : Matthew T. Crisfield, Steven James Johnston and John Richard McCarthy It is certified that error appears in the above-identified patent and that said Letters Patent is hereby corrected as shown below:

<u>Column 8, cont'd,</u>
Line 46, replace "15. The Coriolis flow meter of claim 1 further comprising:" with
-- 15. The Coriolis flow meter of claim 14 further comprising: --

Signed and Sealed this

Tenth Day of September, 2002

Attest:

JAMES E. ROGAN
Attesting Officer           *Director of the United States Patent and Trademark Office*